United States Patent [19]

Deaver

[11] 4,261,615

[45] Apr. 14, 1981

[54] CONVERTIBLE TOP STRUCTURE AND METHOD

[76] Inventor: Dann T. Deaver, 20565 Williamsburg Ct., Harper Woods, Mich. 48225

[21] Appl. No.: 77,337

[22] Filed: Sep. 20, 1979

[51] Int. Cl.³ .......................... B23P 7/00; B60J 7/00; B62D 25/06
[52] U.S. Cl. .................................. 296/210; 29/401.1; 296/111
[58] Field of Search ............................. 29/401.1, 426; 296/99 R, 216, 218, 111, 210

[56] References Cited

U.S. PATENT DOCUMENTS

| | | | |
|---|---|---|---|
| 1,919,744 | 7/1933 | Quinn | 296/99 |
| 3,309,759 | 3/1967 | Vittone | 29/401.1 X |
| 3,352,600 | 11/1967 | Wilfert et al. | 296/216 |
| 3,635,518 | 1/1972 | Eger | 296/218 |
| 4,099,313 | 7/1978 | Phillips | 296/99 R X |
| 4,154,473 | 5/1979 | Alexander et al. | 296/210 |
| 4,184,713 | 1/1980 | Matsui et al. | 296/210 |

Primary Examiner—Charlie T. Moon
Assistant Examiner—V. K. Rising
Attorney, Agent, or Firm—Harness, Dickey & Pierce

[57] ABSTRACT

A combined hardtop-soft top conversion structure and method for notchback coupes generally comprising (a) the removal of rear side glass and rear window, removal of the vehicle roof just near of the "A" pillar and rear of the inner header structure, with the removal being complete from the top of the "B" pillars to the bottom of the "C" pillars, (b) the attachment of a roll bar to the upper ends of the "B" pillars and gusset reinforcements to the rear of the "B" pillars, (c) capping the roll bar, "B" pillar and gusset reinforcements with a molded plastic bow (sometimes referred to as a 'targa' bow), (d) attachment of a folding convertible top to the rear of the 'targa' bow, (e) attachment of a front roof support or header to the remaining front roof portion and inner header structure, and (f) insertion of a removable hard roof or hatch supported between the front roof support and the front of the 'targa' bow.

16 Claims, 17 Drawing Figures

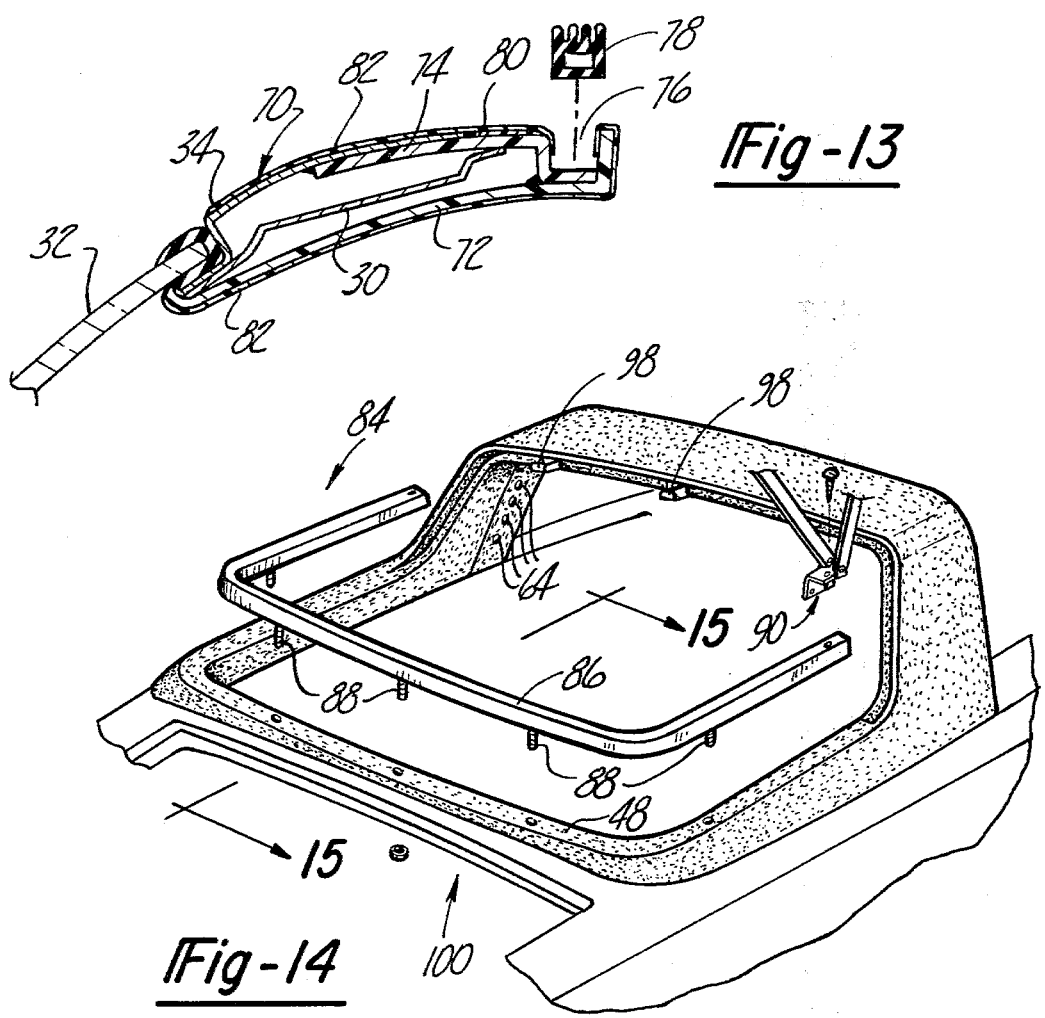
Fig-13
Fig-14
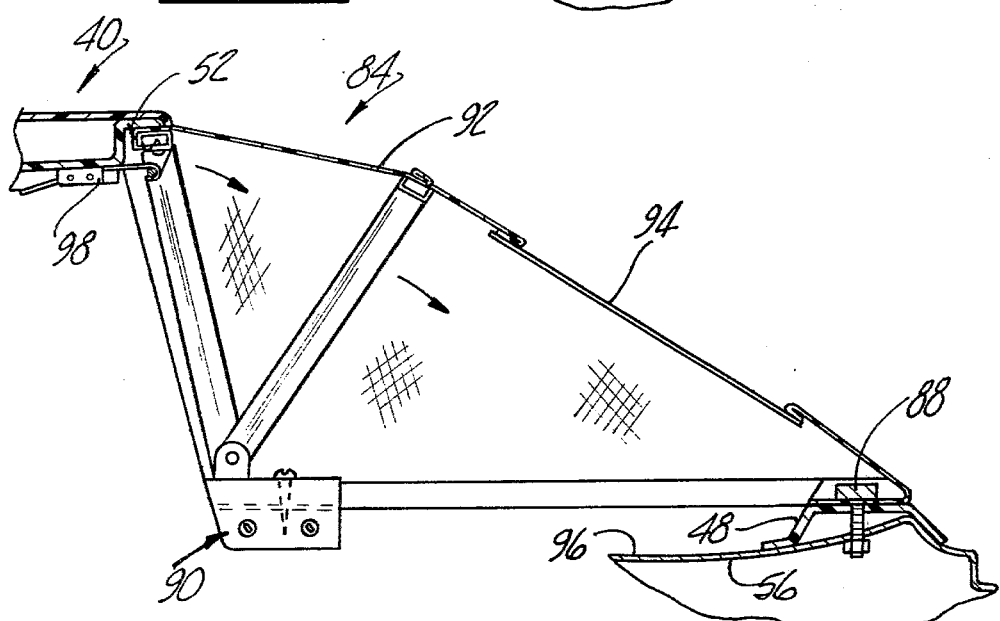
Fig-15

CONVERTIBLE TOP STRUCTURE AND METHOD

SUMMARY—BACKGROUND OF THE INVENTION

The present invention relates to a structure and method for a convertible conversion for notchback coupes.

The present invention provides a simple structure and method for converting a permanent, full hard roof notchback coupe into a removable front hardtop and retractible rear soft top convertible. With this method and structure the front and side windows are left intact; only the rear side glass and rear window need be removed. The roof is substantially removed and replaced with a center bow assembly which extends transversely across the top of the vehicle to provide roll over support. The trimmed bow assembly provides rear support and sealing for a removable hardtop and also provides front support and sealing for a retractible soft top assembly. A front roof support provides front support and sealing for the removable hardtop. Where necessary longitudinal reinforcing rails can be added to compensate for rigidity lost by removal of the roof and glass.

Other objects, features, and advantages of the present invention will become apparent from the subsequent description and the appended claims, taken in conjunction with the accompanying drawings, in which:

BRIEF DESCRIPTION OF THE DRAWINGS

FIG. 13 is a sectional view to enlarged scale taken along the line 13—13 in FIG. 12 of the front roof support and remaining front roof portion with the front roof seal shown in displaced position;

FIG. 14 is a fragmentary, pictorial view taken from the right rear side of the vehicle with a portion of a soft convertible top structure shown as it is being assembled to the rear portion of the bow assembly (see Step 16, FIG. 1);

FIG. 15 is a sectional view after the soft convertible top structure is assembled and taken along the lines 15—15 in FIG. 14;

DESCRIPTION OF THE METHOD AND STRUCTURE

Step 1—Weld Frame Reinforcements

Because the subject conversion results in removal of a substantial portion of the vehicle roof structure, it is important that the structural integrity of the vehicle body be restored. Thus the first step is to add that amount of reinforcement to the underbody to compensate for the loss in structure from roof removal.

Figure 1:
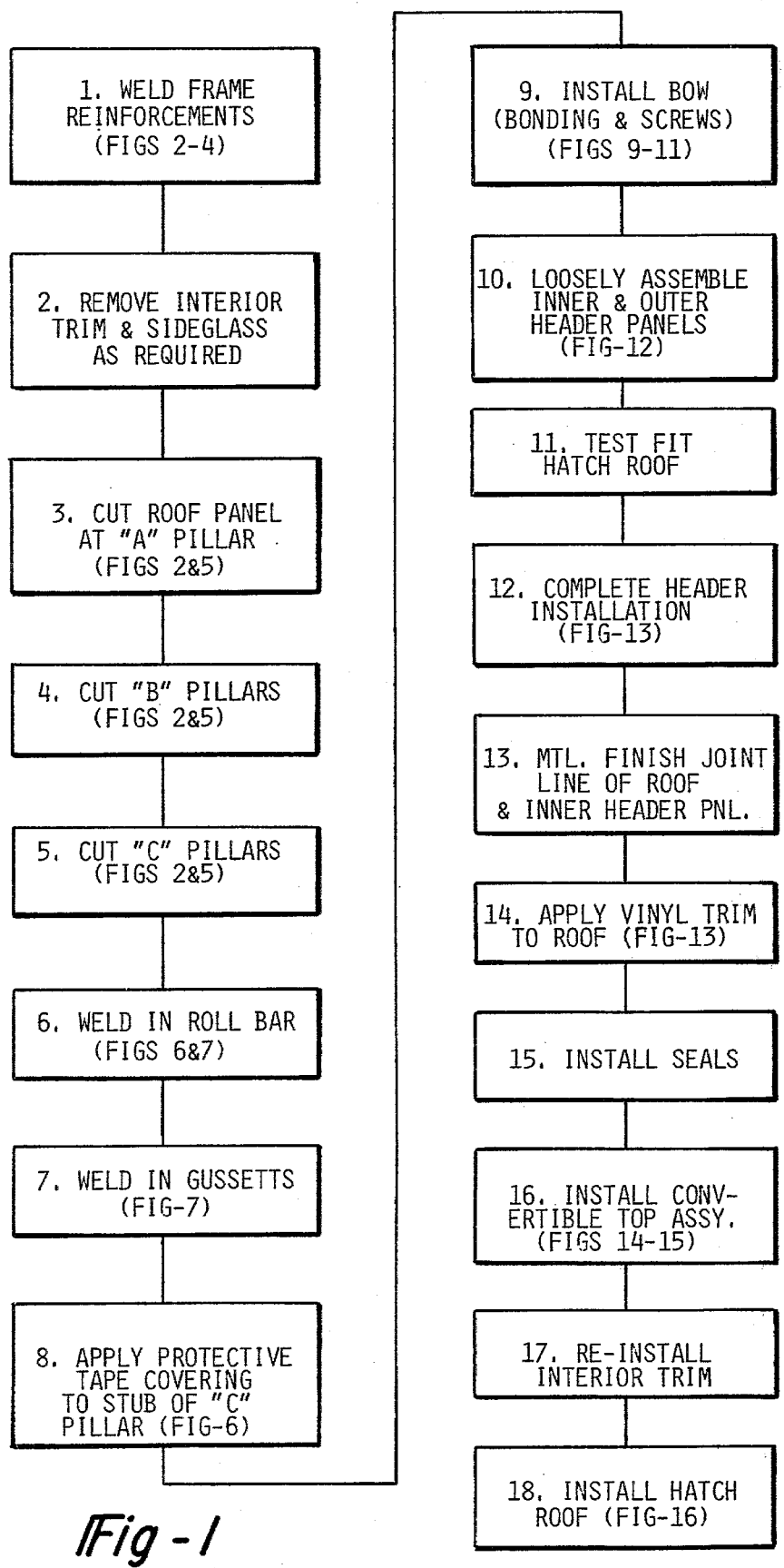
FIG. 1 is a block diagram setting forth the steps in the method of convertible conversion of the present invention.
Figure 2:
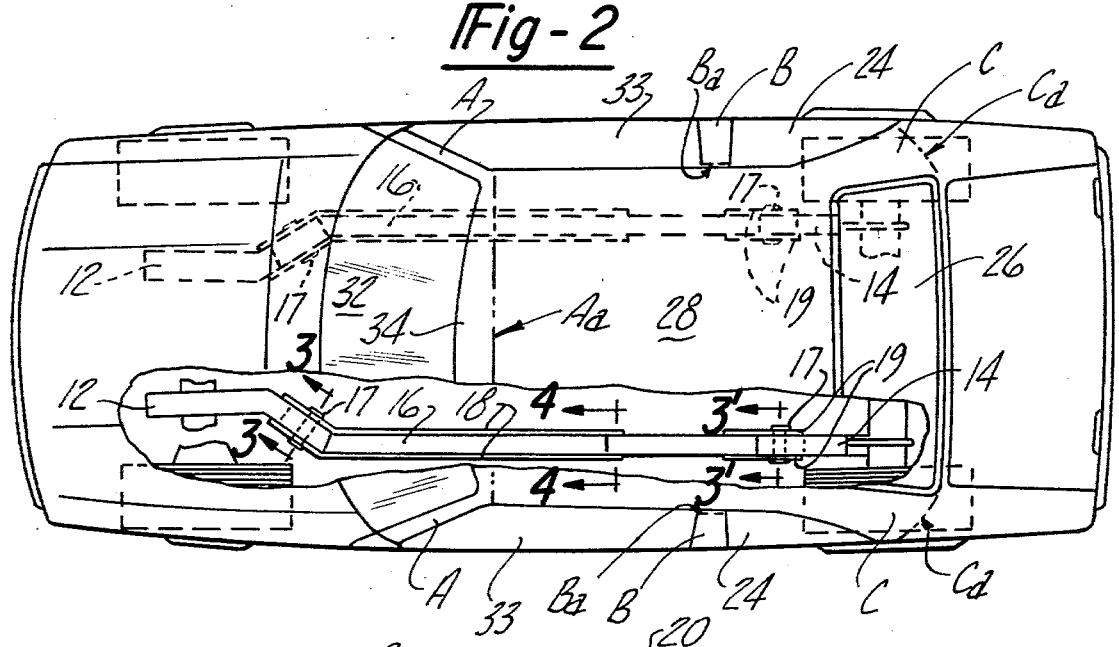
FIG. 2 is a top elevational view of a vehicle with some parts shown broken away, of a first step in the method, i.e. the addition of frame and/or body reinforcements (see Step 1 of FIG. 1)
Figure 3:
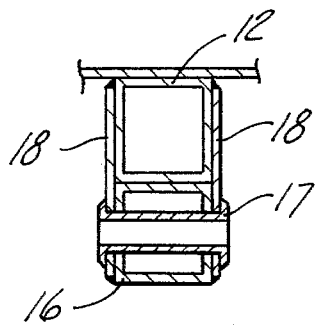
FIGS. 3 and 4 are sectional views taken along the lines 3—3 and 4—4 respectively, of FIG. 2 of the attachment of the frame reinforcements to existing body structure.
Figure 4:
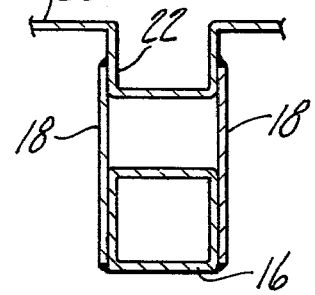

Looking now to FIGS. 2-3 of the drawings a notchback coupe 10 is shown to have front and rear stub frame members 12 and 14, respectively, (shown as 12 on FIG. 3 but because of the identity of cross-sections it should be noted that the section 3—3 is the same as '3—'3 for stub member 14). Longitudinally extending section 16 is connected to stub frames 12 and 14 by generally co-extensively extending side plates 18 and 19, respectively, i.e. side plates 18 and 19 are separated for a short distance at the rear foot wells of the vehicle. The side plates 18 and 19 are secured, as by welding, to the stub members 12 and 14 and to the section 16. Side plates 18 are secured along a portion of their length to a floor pan support 20 as at indented portions 22 (see FIG. 4). The reinforcement section 16 is generally shown as a box section. It should be realized that these are shown only by way of example and that other additional and/or variously shaped reinforcing structures may be utilized, depending upon the underbody structure.

Note that it is preferred that the reinforcement step be made before any reduction in body strength, stiffness, etc., by roof and glass removal. This assures that during subsequent processing, the vehicle body will not be damaged by distortion which may occur from roof and glass removal.

Tie down brackets or bushings 17 are located fore and aft in order to provide sloping tie down locations which minimize bending loads on the vehicle. This can be significant with convertible type body structures. In lieu of bushings 17 welded on brackets could be used at approximately the same fore and aft locations.

Step 2—Removal of Interior Trim, Side Glass and Rear Window

The next step is the removal of the fixed, rear side glass 24 and the rear window 26. At the same time the interior trim is removed.

Step 3—Cut Roof Panel at "A" Pillar

Figure 6:
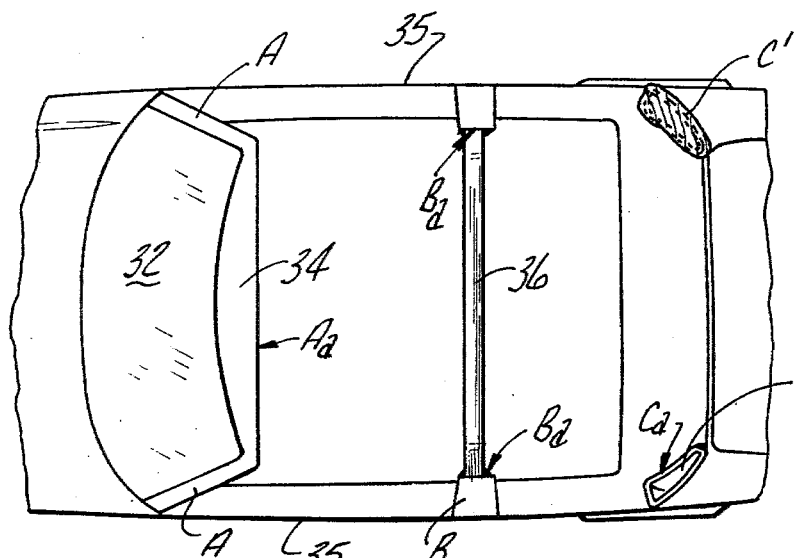
FIG. 6 is a top elevational view of the vehicle of FIG. 1 after the roof structure has been partially cut away and depicting the addition of a roll bar to the "B" pillars of the vehicle (see Step 6 of FIG. 1)
Figure 7:
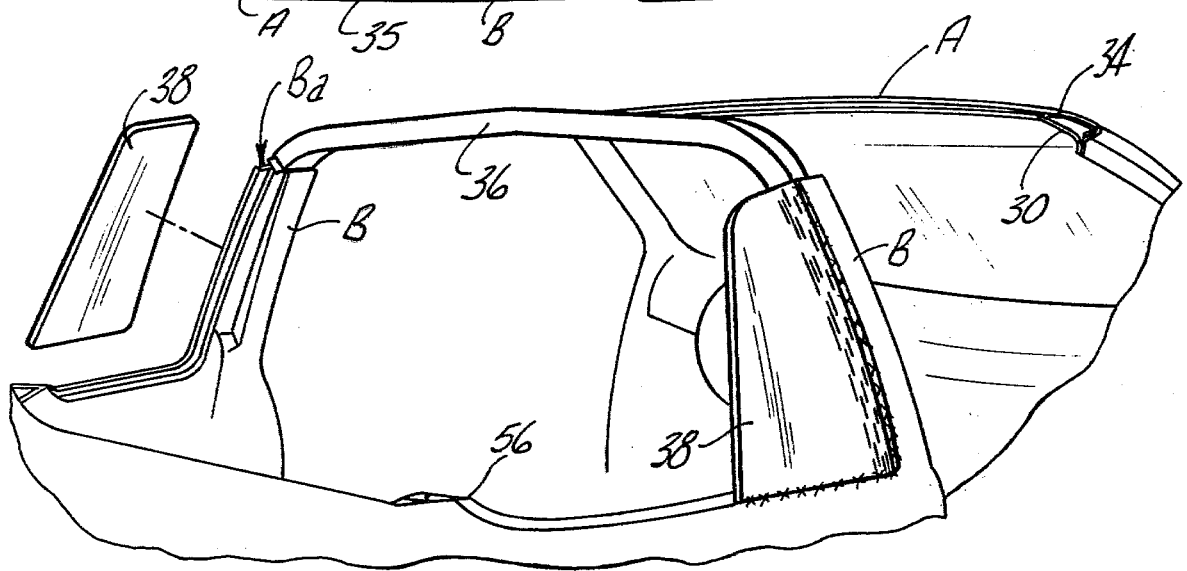
FIG. 7 is a fragmentary, pictorial view of the roof structure viewing the vehicle generally from the right rear side and depicting the addition of gusset reinforcements to add roll strength (see Step 7 of FIG. 1)

With the interior trim removed, the roof panel 28 is cut along the line Aa (see FIGS. 2, 5 and 6) just rear of an inner reinforcement header 30 which is located beneath the front section of the roof panel 28 and extends transversely between the "A" pillars A, (see FIGS. 7 and 13). This leaves the "A" pillars A intact along with the windshield 32, associated seals, side door windows 33 and associated front side seals. Note that the side door windows 33 are unframed and are retractibly located in side doors 35. At the same time a front portion 34 of the roof panel 28 is left remaining. However, other cuts must be made to remove the bulk of the roof panel 28.

Step 4—Cut "B" Pillars

Looking to FIGS. 2, 5, 6 and 7, the next step is to cut the "B" pillars B just below the roof line 28 along the lines Ba. As cut the "B" pillars retain most of the "B" pillars original structure and the shoulder harness reel mount (not shown). In addition the rear side seals for the side windows 33 can be retained on the "B" pillars B.

Step 5—Cut "C" Pillars

Figure 5:
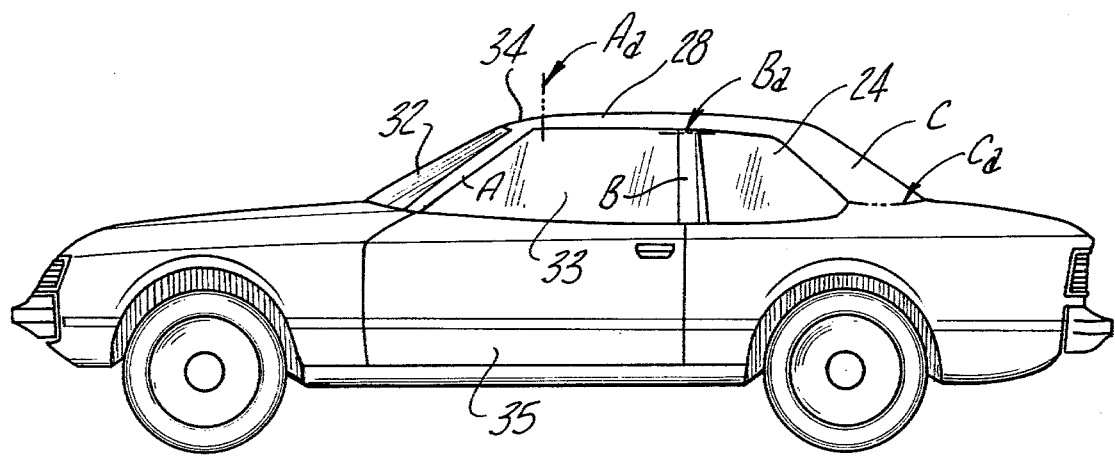
FIG. 5 is a side elevational view of the vehicle of FIG. 1 depicting the lines at which the vehicle body (mainly the roof structure) is to be cut (see Steps 3, 4 and 5 of FIG. 1)

Looking to FIGS. 2, 5 and 6, the "C" pillars C are cut off at their juncture to the vehicle body along the lines Ca.

Now the major portion of the roof 28, side glass 24 and rear window 26 have been removed.

Step 6—Weld on Roll Bar

Figure 10:
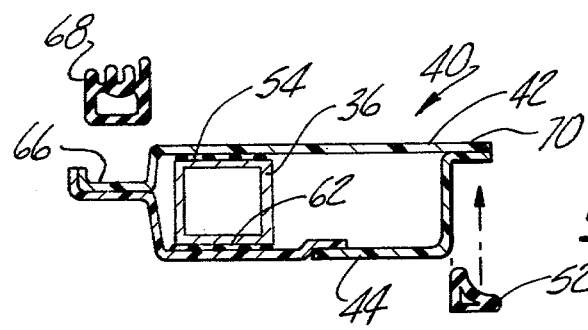
FIG. 10 is a sectional view to enlarged scale taken along the line 10—10 in FIG. 9 of the bow assembly and roll bar of the vehicle with the rear roof seal and front soft top seal shown in displaced positions.

Next a generally box sectioned roll bar 36 (see FIGS. 6 and 10) is extended transversely across the body at the "B" pillars and is welded to the cut ends of the "B" pillars B.

Step 7—Weld on Gussets

In order to provide additional strength for vehicle roll over a pair of generally triangularly shaped gussets 38 (see FIG. 7) are welded to the "B" pillars B and to the adjacent body structure (the welded areas indicated in FIG. 7 by a series of X's).

Step 8—Apply Protective Tape Covering to Stub of "C" Pillar C

While not a crucial step, the stub C' of the "C" pillar C is covered with a protective tape or other suitable coating to preclude scratching or marring by the exposed sharp edges of the materials to be later assembled. At the same time the wiring harness (not shown) for the interior coach lights can be attached and taped to the roll bar 36.

Step 9—Install Bow

It is important to provide a dimensionally set opening and support for the rear convertible soft top and also to provide for the rear support for the removal hard roof. This is provided by a transverse bow or 'targa' bow assembly 40.

Figure 8:
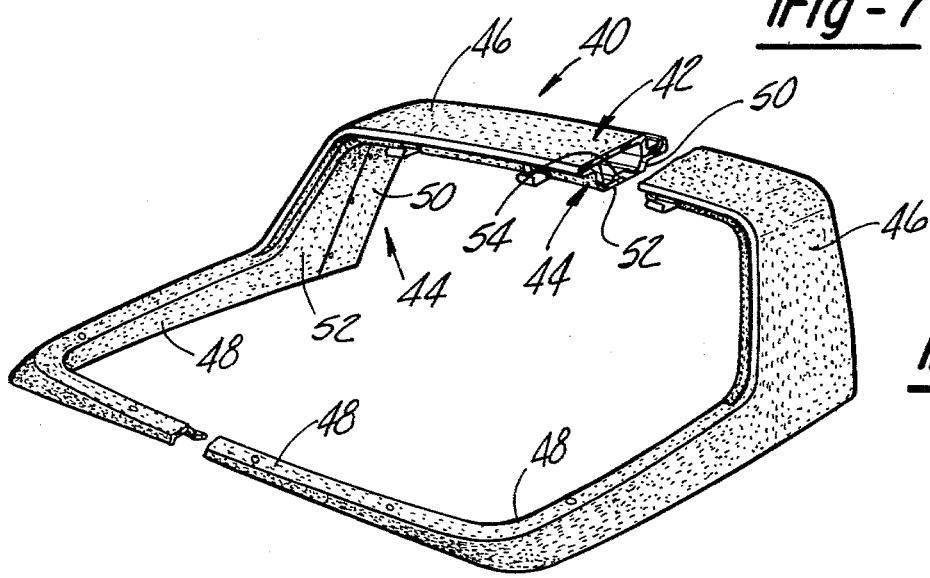
FIG. 8 is a pictorial view with some parts shown in section of a bow assembly shown assembled, for illustration purposes only, independently of the roll bar and associated portions of the vehicle body.

Thus the next step is to install the transverse bow (or targa) assembly 40 (see FIG. 8). The bow (targa) assembly 40 can be considered to be constructed of two main components, an outer bow and frame 42 and an inner bow cover 44. The outer bow and frame 42 comprises a covering portion 46 to cover the roll bar 36 and gussets 38 and further comprises a rear deck frame portion 48.

The inner bow cover 44 can be constructed of two parts 50 and 52 which can be bonded together along an overlapping seam 54.

Figure 11:
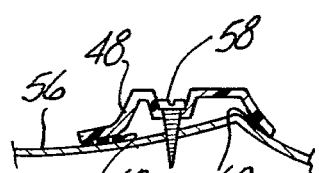
FIG. 11 is a sectional view to enlarged scale taken along the line 11—11 in FIG. 9 of the bow assembly as secured to the rear sheet metal of the vehicle.

First the outer bow and frame 42 is fixed to the body and overlaps the roll bar 36 with an insulating strip 54 located therebetween. The rear deck frame portion 48 is contoured to generally mate with the rear deck sheet metal 56 and is secured thereto by fasteners 58 (see FIGS. 7, 8, 9, 11 and 15) with appropriate sealant 60 located therebetween (see FIG. 11). Next the inner bow cover 44 is fixed to the inside of the roll bar 36 via inner insulating strip 62 (FIG. 10) and also to the gussets 38 via fasteners 64 (see FIG. 14). Adhesives can be located where necessary for additional securement.

Because the bow assembly 40 will be carrying some structural loads its outer bow frame 42 and inner cover 44 can be constructed of a glass fiber-reinforced plastic (FRP); in addition to providing needed structural strength, the material can be sculptured and/or painted for aesthetic purposes.

The bow assembly 40 defines a transversely extending forward trough 66 (see FIG. 10) which receives an elastomeric seal 68 which provides the rear seal for a removable hardtop. The bow assembly 40 also defines a rearward transverse lip 70 which receives a transversely extending, elastomeric seal 72 which provides a peripheral seal for the rear retractible soft top.

Step 10—Loosely Assemble Inner and Outer Header Panels

Figure 9:
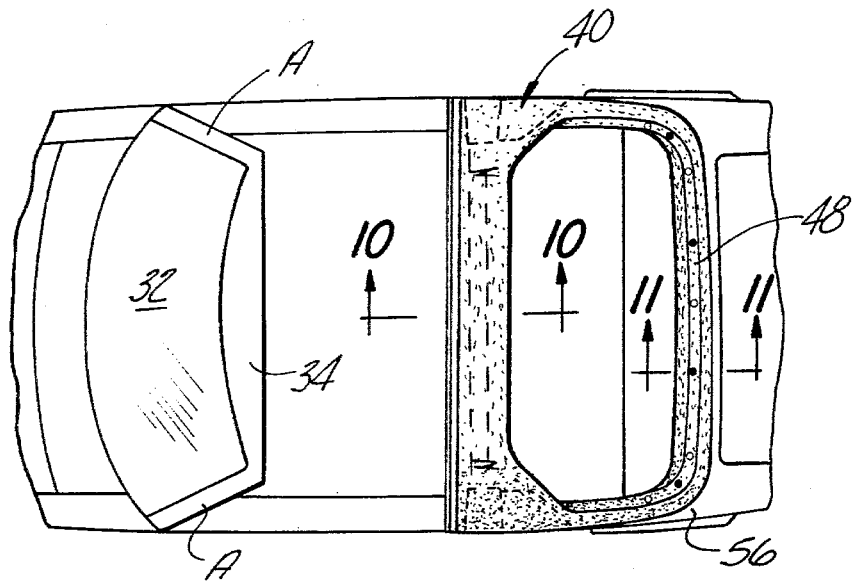
FIG. 9 is a fragmentary, top elevational view of the vehicle after the bow assembly has been installed (see Step 9, FIG. 1)

As can be seen from FIGS. 8, 9 and 14 the bow (targa) assembly provides a dimensionally, generally fixed rear opening to receive a compatible soft top assembly. However, the distance from the cutline Aa to the rear hardtop seal 68 can vary. In order to control this dimension and hence to control the front hardtop opening, a front roof support 70 comprised of inner and outer header panels 72 and 74, respectively, is loosely mounted to the remaining roof portion 34 and header support 30 (see FIGS. 7 and 13). The inner and outer header panels 72 and 74, respectively, can be constructed of FRP (plastic) and are secured together at their rearward ends to define a transversely extending trough 76. Their forward ends, however, are separated thus permitting insertion of the forward free end of outer member 74 between the remaining roof portion 34 and header support 30 with the forward, free end of the inner member 72 located proximate the beginning of the header support 30.

Step 11—Test Fit Hatch (or Hardtop) Roof

Step 12—Complete Header Installation

Figure 12:
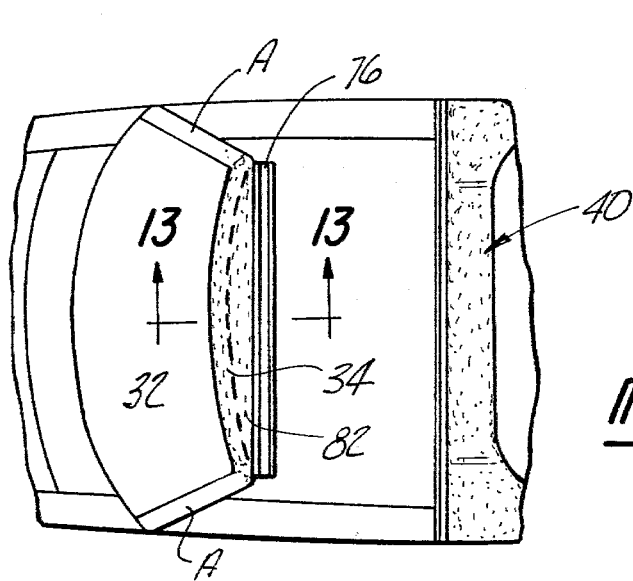
FIG. 12 is a fragmentary, top elevational view of the front roof support or header as assembled to the remaining front roof portion (see Step 10, FIG. 1)
Figure 16:
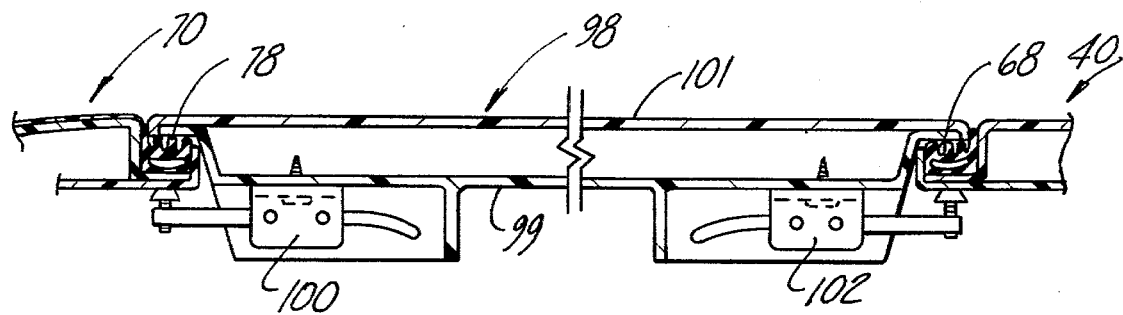
FIG. 16 is a fragmentary, longitudinal sectional view taken generally through the transverse center of the vehicle and with the removable hardtop in place in assembly relationship with the front roof support and front portion of the bow assembly (see Step 18, FIG. 1)

The inner and outer members 72 and 74 can be secured to the roof portion 34 and header support 30 by a suitable adhesive and can be first located and manipulated to provide the desired opening relative to the rear bow seal 68 (see FIGS. 12, 13 and 16) to accept the removable hatch or hardtop roof. An elastomeric seal 78 can be secured on the trough 76 to provide the necessary front seal for the removal hardtop. Once properly positioned the inner and outer members 72 and 74 can be permanently secured.

Step 13-Metal Finish Joint Line of Roof and Inner Header Panel

Step 14—Apply Vinyl Trim to Roof

Next a plastic filler 80 is applied to smooth the outer surface transition between the roof portion 34 and the outer header member 74 (FIG. 13). Finally decorative vinyl sheeting 82 is applied to the visible areas of the front header installation and this portion is now complete. The vinyl sheeting 82 can be omitted and the unfinished, exposed areas can be painted or prepainted.

Step 15—Install Seals

All necessary seals, including those previously identified can now be installed.

Step 16—Install Convertible Top Assembly

Next a soft, retractible convertible top assembly 84 can be installed (see FIGS. 14 and 15). Assembly 84 has a lower frame 86 which can be secured through the rear deck frame portion 48 and to the rear deck sheet metal 56 via a plurality of fasteners 88.

A pivot bar assembly 90 (FIGS. 14, 15) is secured to the lower frame 86 and has secured thereto a foldable soft top 92 and flexible window 94 which can be manually raised to the position shown in FIG. 15 or can be collapsed or retracted onto a rear body shelf 96. A series of manually actuable clamps 98 cooperate between the bow assembly 40 and the soft top assembly 84 to sealing clamp the top assembly 84 against seal 52 in its raised condition or to release the soft top assembly 84 for retraction against shelf 96. The clamps 98 can be located in recessed areas in inner bow cover 44 and screw fasteners (not shown) can be used to further secure the inner bow cover 44 to the roll bar 36. The fastening step can be performed at Step 9 previously discussed.

Step 17—Reinstall Interior Trim

Next the interior trim, including coach lights, (not shown) of the vehicle can be reinstalled, which for all practical purposes completes the conversion process.

Step 18—Install Hatch (or Hardtop) Roof

Finally a removable hatch or hardtop roof 98 (FIGS. 16 and 17) can be installed in the opening between the front roof support 70 and the bow assembly 40.

A plurality of manually actuable clamps 100 and 102 (FIG. 16) cooperate to sealingly lock the removable hardtop roof 98 to the front seal 78 and rear seal 68. The removable roof 98 can be made of a channel or box like structure, with stiffener ribs if necessary, molded from inner and outer panels 99 and 101, respectively, which are FRP. Alternatively, the roof 98 can be of a construction including saftey plate glass and/or transparent plastic. The hardtop roof 98 also provides upper seals 103 for the side windows 33 (see FIG. 17). The removable roof 98 is designed to be of a size to be accepted into the vehicle trunk 100.

Figure 17:
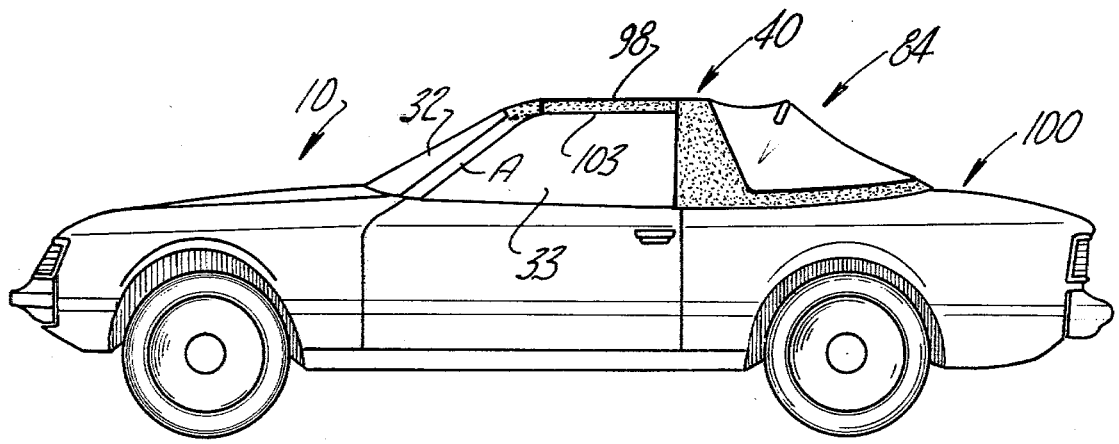
FIG. 17 is a side elevational view of the finished conversion with the hardtop roof on and with the rear soft top raised.

The finished conversion with soft top assembly 84 raised and removable hardtop 98 in place is shown in FIG. 17. Obviously, the converted vehicle 10 can be operated with both the hardtop removed and soft top down, both tops up, or one of the tops up and the other down or removed.

Note that with the method and structure shown the convertion can be completed without the need for repainting the vehicle.

While it will be apparent that the preferred embodiments of the invention disclosed are well calculated to fulfill the objects above stated, it will be appreciated that the invention is susceptible to modification, variation and change without departing from the proper scope or fair meaning of the invention.

What is claimed is:

1. In a coupe type vehicle having a generally notchback body structure with a hard roof supported by A, B and C pillars and having unframed side windows, fixed rear side glass and a rear window, and further having a transversely extending inner reinforcement header located beneath the front portion of the hard roof and extending between the A pillars, the method of converting the vehicle to a combined hardtop-soft top vehicle comprising the steps of:

(1) reinforcing the underbody of the vehicle to compensate for loss of structural rigidity from susbsequent removal of the hard roof prior to such roof removal to preclude body distortion during the conversion, (2) removing the interior trim, the rear side glass and the rear window, (3) substantially removing the hard roof by:
  (a) cutting the hard roof transversely between the A pillars and proximate to the inner reinforcement header leaving a relatively short roof portion extending generally coextensively with the reinforcement header,
  (b) cutting the hard roof from the B pillars at their upper ends, and
  (c) cutting the C pillars and hard roof from the vehicle body, (4) welding a roll bar to the cut upper ends of the B pillars such that it extends transversely across the vehicle, (5) securing gussets to the rearward side of the B pillars and the vehicle body, (6) providing a bow assembly of a molded reinforced plastic material to generally encase the roll bar and gussets,
  the bow assembly comprising an outer bow and frame member adapted to generally cover the outer surfaces of the roll bar and gussets and having a rearwardly extending frame portion defining a preselected rear opening,
  the bow assembly further comprising an inner bow member for generally covering the inner surfaces of the roll bar and gussets and adapted to be secured to the outer bow and frame member after the latter has been installed,
  the bow assembly including front and rear seals, (7) securing a front roof support to the roof portion and reinforcement header by:
  (a) loosely assembling a front roof support to the roof portion and reinforcement header, the front roof support comprising a two piece structure of a molded reinforced plastic and including inner and outer header panels secured together at one end, the front roof support having the outer header panel located between the roof portion and reinforcement header and the inner header panel located beneath the reinforcement header, the front roof support including a forward seal,
  (b) manipulating the front roof support a preselected distance from the bow assembly to define a predetermined top opening and securing the front roof support in that position, (8) securing a retractible, convertible soft top assembly to the rearwardly extending frame portion of the bow assembly with the convertible soft top adapted to fit into the rear opening and seal against the bow assembly rear seal, (9) locating a removable hardtop roof into the top opening, with the hardtop roof being sealed by the bow assembly front seal and the roof support forward seal, the hardtop roof being constructed of a molded reinforced plastic and providing upper seals for the side windows,

(10) applying the interior trim and plastic trim to the front roof support and roof portion whereby the conversion can be completed without the need for repainting the vehicle.

2. In a coupe type vehicle having a generally notchback body structure with a hard roof supported by A, B and C pillars and having side windows, rear side glass and a rear window, and further having a transversely extending inner reinforcement header located beneath the front portion of the hard roof and extending between the A pillars, the method of converting the vehicle to a combined hardtop-soft top vehicle comprising the steps of:

(1) reinforcing the underbody of the vehicle to compensate for loss of structural rigidity from subsequent removal of the hard roof prior to such roof removal to preclude body distortion during the conversion, (2) removing the interior trim, the rear side glass and the rear window, (3) substantially removing the hard roof by:
  (a) cutting the hard roof transversely between the A pillars and proximate to the inner reinforcement header leaving a relatively short roof portion extending generally coextensively with the reinforcement header,
  (b) cutting the hard roof from the B pillars at their upper ends, and
  (c) cutting the C pillars and hard roof from the vehicle body, (4) securing a roll bar to the cut upper ends of the B pillars such that it extends transversely across the vehicle, (5) securing gussets to the rearward side of the B pillars and the vehicle body, (6) providing a bow assembly to generally encase the roll bar and gussets,
  the bow assembly comprising an outer bow and frame member adapted to generally cover the outer surfaces of the roll bar and gussets and having a rearwardly extending frame portion defining a preselected rear opening,
  the bow assembly further comprising an inner bow member for generally covering the inner surface of the roll bar and gussets and adapted to be secured to the outer bow and frame member after the latter has been installed,
  the bow assembly including front and rear seals, (7) securing a front roof support to the roof portion and reinforcement header by:
  (a) loosely assembling a front roof support to the roof portion and reinforcement header, the front roof support comprising a two piece structure and including inner and outer header panels secured together at one end, the front roof support having the outer header panel located between the roof portion and reinforcement header and the inner header panel located beneath the reinforcement header, the front roof support including a forward seal,
  (b) manipulating the front roof support a preselected distance from the bow assembly to define a predetermined top opening and securing the front roof support in that position, (8) securing a retractible convertible soft top assembly to the rearwardly extending frame portion of the bow assembly with the convertible soft top adapted to fit into the rear opening and seal against the bow assembly rear seal, (9) locating a removable hardtop roof into the top opening, with the hard top roof being sealed by the bow assembly front seal and the roof support forward seal, and the hardtop roof providing upper seals for the side windows.

3. In a coupe type vehicle having a generally notchback body structure with a hard roof supported by A, B and C pillars and having side windows, rear side glass and a rear window, and further having a transversely extending inner reinforcement header located beneath the front portion of the hard roof and extending between the A pillars, the method of converting the vehicle to a combined hardtop-soft top vehicle comprising the steps of:

(1) reinforcing the underbody of the vehicle to compensate for loss of structural rigidity from subsequent removal of the hard roof, (2) removing the interior trim, the rear side glass and the rear window, (3) substantially removing the hard roof by:
  (a) cutting the hard roof transversely between the A pillars and proximate to the inner reinforcement header leaving a relatively short roof portion extending generally coextensively with the reinforcement header,
  (b) cutting the hard roof from the B pillars at their upper ends, and
  (c) cutting the C pillars and hard roof from the vehicle body, (4) securing a roll bar to the cut upper ends of the B pillars such that it extends transversely across the vehicle, (5) securing gussets to the rearward side of the B pillars and the vehicle body, (6) providing a bow assembly to generally encase the roll bar and gussets,
  the bow assembly comprising an outer bow and frame member adapted to generally cover the outer surfaces of the roll bar and gussets and having a rearwardly extending frame portion defining a preselected rear opening,
  the bow assembly further comprising an inner bow member for generally covering the inner surfaces of the roll bar and gussets and adapted to be secured to the outer bow and frame member after the latter has been installed, (7) securing a front roof support to the roof portion and reinforcement header by:
  (a) loosely assembling a front roof support to the roof portion and reinforcement header, the front roof support including inner and outer header panels joined together at one end, the front roof support having the outer header panel located between the roof portion and reinforcement header and the inner header panel located beneath the reinforcement header,
   (b) manipulating the front roof support a preselected distance from the bow assembly to define a predetermined top opening and securing the front roof support in that position,
(8) securing a retractible convertible soft top assembly to the rearwardly extending frame portion of the bow assembly with the convertible soft top adapted to fit into the rear opening,
(9) locating a removable hardtop roof into the top opening.

4. In a coupe type vehicle having a generally notchback body structure with a hard roof supported by A, B and C pillars and having side windows, rear side glass and a rear window, and further having a transversely extending inner reinforcement header located beneath the front portion of the hard roof and extending between the A pillars, the method of converting the vehicle to a combined hardtop-soft top vehicle comprising the steps of:
(1) reinforcing the underbody of the vehicle to compensate for loss of structural rigidity from subsequent removal of the hard roof,
(2) removing the interior trim, the rear side glass and the rear window,
(3) substantially removing the hard roof by:
   (a) cutting the hard roof transversely between the A pillars and proximate to the inner reinforcement header leaving a relatively short roof portion extending generally coextensively with the reinforcement header,
   (b) cutting the hard roof from the B pillars at their upper ends, and
   (c) cutting the C pillars and hard roof from the vehicle body,
(4) securing a roll bar to the cut upper ends of the B pillars transversely such that it extends transversely across the vehicle,
(5) providing a bow assembly to generally encase the roll bar,
   the bow assembly comprising an outer bow and frame member adapted to generally cover the outer surfaces of roll bar and having a rearwardly extending frame portion defining a preselected rear opening,
   the bow assembly further comprising an inner bow member for generally covering the inner surfaces of the roll bar and adapted to be secured to the outer bow and frame member after the latter has been installed,
(6) securing a front roof support to the roof portion and reinforcement header by:
   (a) loosely assembling a front roof support to the roof portion and reinforcement header, the front roof support including inner and outer header panels joined together at one end, the front roof support having the outer header panel located between the roof portion and reinforcement header and the inner header panel located beneath the reinforcement header,
   (b) locating the front roof support a preselected distance from the bow assembly to define a predetermined desired top opening and securing the front roof support in that position,
(7) securing a retractible convertible soft top assembly to the rearwardly extending frame portion of the bow assembly with the convertible soft top adapted to fit into the rear opening,
(8) locating a removable hardtop roof into the top opening.

5. In a coupe type vehicle having a generally notchback body structure with a hard roof supported by A, B and C pillars and having side windows, rear side glass and a rear window, and further having a transversely extending inner reinforcement header located beneath the front portion of the hard roof and extending between the A pillars, the method of converting the vehicle to a combined hardtop-soft top vehicle comprising the steps of:
(1) removing the rear side glass and the rear window and substantially removing the hard roof by:
   (a) cutting the hard roof transversely between the A pillars and proximate to the inner reinforcement header leaving a relatively short roof portion extending generally coextensively with the reinforcement header,
   (b) cutting the hard roof from the B pillars at their upper ends, and
   (c) cutting the C pillars and hard roof from the vehicle body,
(2) securing a roll bar to the cut upper ends of the B pillars transversely such that it extends across the vehicle,
(3) providing a bow assembly to generally encase the roll bar,
   the bow assembly having a rearwardly extending frame portion defining a preselected rear opening,
(4) securing a front roof support to the roof portion and reinforcement header by:
   (a) loosely assembling a front roof support to the roof portion and reinforcement header, the front roof support including inner and outer header panels secured together at one end, the front roof support having the outer header panel located between the roof portion and reinforcement header and the inner header panel located beneath the reinforcement header,
   (b) locating the front roof support a preselected distance from the bow assembly to define a predetermined desired top opening and securing the front roof support in that position,
(5) securing a retractible convertible soft top assembly to the rearwardly extending frame portion of the bow assembly with the convertible soft top adapted to fit into the rear opening,
(6) locating a removable hardtop roof into the top opening.

6. In a coupe type vehicle having a generally notchback body structure with a hard roof supported by A, B and C pillars and having said windows, rear side glass and a rear window, and further having a transversely extending inner reinforcement header located beneath the front portion of the hard roof and extending between the A pillars, the method of converting the vehicle to a combined hardtop-soft top vehicle comprising the steps of:
(1) removing the rear side glass and rear window and substantially removing the hard roof by:
   (a) cutting the hard roof transversely between the A pillars and proximate to the inner reinforcement header leaving a relatively short roof portion extending generally coextensively with the reinforcement header, (b) cutting the hard roof from the B pillars at their upper ends, and (c) cutting the C pillars and hard roof from the vehicle body, (2) securing a roll bar to the cut upper ends of the B pillars transversely such that it extends across the vehicle, (3) providing a bow assembly to generally encase the roll bar, the bow assembly having a rearwardly extending frame portion defining a preselected rear opening, (4) securing a front roof support to the roof portion and reinforcement header, the front roof support including inner and outer header panels secured together at one end, the front roof support having the outer header panel located between the roof portion and reinforcement header and the inner header panel located beneath the reinforcement header, locating the front roof support a preselected distance from the bow assembly to define a predetermined desired top opening and securing the front roof support in that position, (5) securing a retractible convertible soft top assembly to the rearwardly extending frame portion of the bow assembly with the convertible soft top adapted to fit into the rear opening, (6) locating a removable hardtop roof into the top opening.

7. In a coupe type vehicle having a generally notchback body structure with a hard roof supported by A, B and C pillars and having side windows, rear side glass and a rear window, and further having a transversely extending inner reinforcement header located beneath the front portion of the hard roof and extending between the A pillars, the method of converting the vehicle to a combined hardtop-soft top vehicle comprising the steps of:

(1) reinforcing the underbody of the vehicle to compensate for loss of structural rigidity from subsequent removal of the hard roof, (2) removing the rear side glass and rear window and substantially removing the hard roof by:

(a) cutting the hard roof transversely between the A pillars and proximate to the inner reinforcement header leaving a relatively short roof portion extending generally coextensively with the reinforcement header, (b) cutting the hard roof from the B pillars at their upper ends, and (c) cutting the C pillars and hard roof from the vehicle body, (3) securing a roll bar to the cut upper ends of the B pillars such that it extends transversely across the vehicle, (4) providing a bow assembly to generally encase the roll bar, the bow assembly having a rearwardly extending frame portion defining a preselected rear opening, (5) securing a front roof support to the roof portion and reinforcement header, the front roof support including inner and outer header panels secured together at one end, locating the front roof support a preselected distance from the bow assembly to define a predetermined top opening and securing the front roof support in that position, (6) securing a retractible convertible soft top assembly to the rearwardly extending frame portion of the bow assembly with the convertible soft top adapted to fit into the rear opening, (7) locating a removable hardtop roof into the top opening.

8. In a coupe type vehicle having a generally notchback body structure with a hard roof supported by A, B and C pillars and having side windows, rear side glass and a rear window, and further having a transversely extending inner reinforcement header located beneath the front portion of the hard roof and extending between the A pillars, the method of converting the vehicle to a combined hardtop-soft top vehicle comprising the steps of:

(1) reinforcing the underbody of the vehicle to compensate for loss of structural rigidity from subsequent removal of the hard roof, the reinforcement comprising longitudinally box sectioned means providing front and rear tie downs located between the front and rear vehicle wheels whereby tie down bending loads are minimized, (2) removing the rear side glass and rear window and substantially removing the hard roof by:

(a) cutting the hard roof transversely between the A pillars and proximate to the inner reinforcement header leaving a relatively short roof portion extending generally coextensively with the reinforcement header, (b) cutting the hard roof from the B pillars at their upper ends, and (c) cutting the C pillars and hard roof from the vehicle body, (3) securing a roll bar to the cut upper ends of the B pillars such that it extends transversely across the vehicle, (4) providing a bow assembly to generally encase the roll bar, the bow assembly having a rearwardly extending frame portion defining a preselected rear opening, (5) securing a front roof support to the roof portion and reinforcement header, including inner and outer header panels secured together at one end, locating the front roof support a preselected distance from the bow assembly to define a predetermined top opening and securing the front roof support in that position, (6) securing a retractible, convertible soft top assembly to the rearwardly extending frame portion of the bow assembly with the convertible soft top adapted to fit into the rear opening, (7) locating a removable hardtop roof into the top opening.

9. In a coupe type vehicle having a generally notchback body structure with a hard roof supported by A, B and C pillars and having unframed side windows, fixed rear side glass and a rear window, and further having a transversely extending inner reinforcement header located beneath the front portion of the hard roof and extending between the A pillars, a convertible vehicle produced by the method of converting the vehicle to a combined hardtop-soft top vehicle comprising the steps of:

(1) reinforcing the under body of the vehicle to compensate for loss of structural rigidity from subsequent removal of the hard roof prior to such roof removal to preclude body distortion during the conversion, (2) removing the interior trim, the rear side glass and the rear window, (3) substantially removing the hard roof by:

(a) cutting the hard roof transversely between the A pillars and proximate to the inner reinforcement header leaving a relatively short roof portion extending generally coextensively with the reinforcement header, (b) cutting the hard roof from the B pillars at their upper ends, and (c) cutting the C pillars and hard roof from the vehicle body, (4) welding a roll bar to the cut upper ends of the B pillars such that it extends transversely across the vehicle, (5) securing gussets to the rearward side of the B pillars and the vehicle body, (6) providing a bow assembly of a molded reinforced plastic material to generally encase the roll bar and gussets, the bow assembly comprising an outer bow and frame member adapted to generally cover the outer surfaces of the roll bar and gussets and having a rearwardly extending frame portion defining a preselected rear opening, the bow assembly further comprising an inner bow member for generally covering the inner surfaces of the roll bar and gussets and adapted to be secured to the outer bow and frame member after the latter has been installed, the bow assembly including front and rear seals, (7) securing a front roof support to the roof portion and reinforcement header by:

(a) loosely assembling a front roof support to the roof portion and reinforcement header, the front roof support comprising a two piece structure of a molded reinforced plastic and including inner and outer header panels secured together at one end, the front roof support having the outer header panel located between the roof portion and reinforcement header and the inner header panel located beneath the reinforcement header, the front roof support including a forward seal, (b) manipulating the front roof support a preselected distance from the bow assembly to define a predetermined top opening and securing the front roof support in that position, (8) securing a retractible, convertible soft top assembly to the rearwardly extending frame portion of the bow assembly with the convertible soft top adapted to fit into the rear opening and seal against the bow assembly rear seal, (9) locating a removable hardtop roof into the top opening, with the hardtop roof being sealed by the bow assembly front seal and the roof support forward seal, the hardtop roof being constructed of a molded reinforced plastic and providing upper seals for the side windows,

(10) applying the interior trim and plastic trim to the front roof support and roof portion whereby the conversion can be completed without the need for repainting the vehicle.

10. In a coupe type vehicle having a generally notchback body structure with a hard roof supported by A, B and C pillars and having side windows, rear side glass and a rear window, and further having a transversely extending inner reinforcement header located beneath the front portion of the hard roof and extending between the A pillars, a convertible vehicle produced by the method of converting the vehicle to a combined hardtop-soft top vehicle comprising the steps of:

(1) reinforcing the underbody of the vehicle to compensate for loss of structural rigidity from subsequent removal of the hard roof, (2) removing the interior trim, the rear side glass and the rear window, (3) substantially removing the hard roof by:

(a) cutting the hard roof transversely between the A pillars and proximate to the inner reinforcement header leaving a relatively short roof portion extending generally coextensively with the reinforcement header, (b) cutting the hard roof from the B pillars at their upper ends, and (c) cutting the C pillars and hard roof from the vehicle body, (4) securing a roll bar to the cut upper ends of the B pillars such that it extends transversely across the vehicle, (5) securing gussets to the rearward side of the B pillars and the vehicle body, (6) providing a bow assembly to generally encase the roll bar and gussets, the bow assembly comprising an outer bow and frame member adapted to generally cover the outer surfaces of the roll bar and gussets and having a rearwardly extending frame portion defining a preselected rear opening, the bow assembly further comprising an inner bow member for generally covering the inner surfaces of the roll bar and gussets and adapted to be secured to the outer bow and frame member after the latter has been installed, (7) securing a front roof support to the roof portion and reinforcement header by:

(a) loosely assembling a front roof support to the roof portion and reinforcement header, the front roof support including inner and outer header panels joined together at one end, the front roof support having the outer header panel located between the roof portion and reinforcement header and the inner header panel located beneath the reinforcement header, (b) manipulating the front roof support a preselected distance from the bow assembly to define a predetermined top opening and securing the front roof support in that position, (8) securing a retractible convertible soft top assembly to the rearwardly extending frame portion of the bow assembly with the convertible soft top adapted to fit into the rear opening, (9) locating a removable hardtop roof into the top opening.

11. In a coupe type vehicle having a generally notchback body structure with a hard roof supported by A, B and C pillars and having side windows, rear side glass and a rear window, and further having a transversely extending inner reinforcement header located beneath the front portion of the hard roof and extending between the A pillars, a convertible vehicle produced by the method of converting the vehicle to a combined hardtop-soft top vehicle comprising the steps of:

(1) reinforcing the underbody of the vehicle to compensate for loss of structural rigidity from subsequent removal of the hard roof, (2) removing the interior trim, the rear side glass and the rear window, (3) substantially removing the hard roof by:

(a) cutting the hard roof transversely between the A pillars and proximate to the inner reinforcement header leaving a relatively short roof portion extending generally coextensively with the reinforcement header, (b) cutting the hard roof from the B pillars at their upper ends, and (c) cutting the C pillars and hard roof from the vehicle body, (4) securing a roll bar to the cut upper ends of the B pillars transversely such that it extends transversely across the vehicle, (5) providing a bow assembly to generally encase the roll bar, the bow assembly comprising an outer bow and frame member adapted to generally cover the outer surfaces of the roll bar having a rearwardly extending frame portion defining a preselected rear opening, the bow assembly further comprising an inner bow member for generally covering the inner surfaces of the roll bar and adapted to be secured to the outer bow and frame member after the latter has been installed, (6) securing a front roof support to the roof portion and reinforcement header by:

(a) loosely assembling a front roof support to the roof portion and reinforcement header, the front roof support including inner and outer header panels joined together at one end, the front roof support having the outer header panel located between the roof portion and reinforcement header and the inner header panel located beneath the reinforcement header, (b) locating the front roof support a preselected distance from the bow assembly to define a predetermined desired top opening and securing the front roof support in that position, (7) securing a retractible convertible soft top assembly to the rearwardly extending frame portion of the bow assembly with the convertible soft top adapted to fit into the rear opening, (8) locating a removable hardtop roof into the top opening.

12. In a coupe type vehicle having a generally notchback body structure with a hard roof supported by A, B and C pillars and having side windows, rear side glass and a rear window, and further having a transversely extending inner reinforcement header located beneath the front portion of the hard roof and extending between the A pillars, a convertible vehicle produced by the method of converting the vehicle to a combined hardtop-soft top vehicle comprising the steps of:

(1) reinforcing the underbody of the vehicle to compensate for loss of structural rigidity from subsequent removal of the hard roof, the reinforcement comprising longitudinally box sectioned means providing front and rear tie downs located between the front and rear vehicle wheels whereby tie down bending loads are minimized, (2) removing the rear side glass and rear window and substantially removing the hard roof by:

(a) cutting the hard roof transversely between the A pillars and proximate to the inner reinforcement header leaving a relatively short roof portion extending generally coextensively with the reinforcement header, (b) cutting the hard roof from the B pillars at their upper ends, and (c) cutting the C pillars and hard roof from the vehicle body, (3) securing a roll bar to the cut upper ends of the B pillars such that it extends transversely across the vehicle, (4) providing a bow assembly to generally encase the roll bar, the bow assembly having a rearwardly extending frame portion defining a preselected rear opening, (5) securing a front roof support to the roof portion and reinforcement header, including inner and outer header panels secured together at one end, locating the front roof support a preselected distance from the bow assembly to define a predetermined top opening and securing the front roof support in that position, (6) securing a retractible, convertible soft top assembly to the rearwardly extending frame portion of the bow assembly with the convertible soft top adapted to fit into the rear opening, (7) locating a removable hardtop roof into the top opening.

13. In a coupe type vehicle having a generally notchback body structure with a hard roof supported by A, B and C pillars and having unframed side windows, fixed rear side glass and a rear window, and further having a transversely extending inner reinforcement header located beneath the front portion of the hard roof and extending between the A pillars, a converted vehicle converted to a combined hardtop-soft top vehicle comprising:

reinforcing means for reinforcing the underbody of the vehicle to compensate for loss of structural rigidity from subsequent removal of the hard roof, the hard roof removed by:

(a) cutting the hard roof transversely between the A pillars and proximate to the inner reinforcement header leaving a relatively short roof portion extending generally coextensively with the reinforcement header, (b) cutting the hard roof from the B pillars at their upper ends, and (c) cutting the C pillars and hard roof from the vehicle body, a roll bar secured to the cut upper ends of the B pillars such that it extends transversely across the vehicle, gussets fixed to the rearward side of the B pillars and the vehicle body, a bow assembly of a molded reinforced plastic material generally encasing the roll bar and gussets, the bow assembly comprising an outer bow and frame member adapted to generally cover the outer surfaces of the roll bar and gussets and having a rearwardly extending frame portion defining a preselected rear opening, the bow assembly further comprising an inner bow member for generally covering the inner surfaces of the roll bar and gussets and adapted to be secured to the outer bow and frame member after the latter has been installed, the bow assembly including front and rear seals, a front roof support secured to the roof portion and reinforcement header;

said front roof support comprising a two piece structure of a molded reinforced plastic and including inner and outer header panels secured together at one end, the front roof support having the outer header panel located between the roof portion and reinforcement header and the inner header panel located beneath the reinforcement header, the front roof support including a forward seal, said front roof support located a preselected distance from the bow assembly to define a predetermined top opening, a retractible, convertible soft top assembly secured to the rearwardly extending frame portion of the bow assembly with the convertible soft top adapted to fit into the rear opening and seal against the bow assembly rear seal, a removable hardtop roof removably locatable in the top opening, with the hardtop roof being sealed by the bow assembly front seal and the roof support forward seal, the hardtop roof being constructed of a molded reinforced plastic and providing upper seals for the side windows, plastic trim located at the front roof support and roof portion whereby the conversion can be completed without the need for repainting the vehicle.

14. In a coupe type vehicle having a generally notchback body structure with a hard roof supported by A, B anc C pillars and having unframed side windows, fixed rear side glass and a rear window, and further having a transversely extending inner reinforcement header located beneath the front portion of the hard roof and extending between the A pillars, a converted vehicle converted to a combined hardtop-soft top vehicle comprising:

reinforcing means for reinforcing the underbody of the vehicle to compensate for loss of structural rigidity from subsequent removal of the hard roof, the hard roof removed by:
 (a) cutting the hard roof transversely between the A pillars and proximate to the inner reinforcement header leaving a relatively short roof portion extending generally coextensively with the reinforcement header,
 (b) cutting the hard roof from the B pillars at their upper ends, and
 (c) cutting the C pillars and hard roof from the vehicle body, a roll bar secured to the cut upper ends of the B pillars such that it extends transversely across the vehicle, a bow assembly of a molded reinforced plastic material to generally encase the roll bar, the bow assembly comprising an outer bow and frame member adapted to generally cover the outer surfaces of the roll bar and having a rearwardly extending frame portion defining a preselected rear opening, the bow assembly further comprising an inner bow member for generally covering the inner surfaces of the roll bar and adapted to be secured to the outer bow and frame member, the bow assembly including front and rear seals, a front roof support secured to the roof portion and reinforcement header, said front roof support comprising a two piece structure of a molded reinforced plastic and including inner and outer header panels secured together at one end, the front roof support having the outer header panel located between the roof portion and reinforcement header and the inner header panel located beneath the reinforcement header, the front roof support including a forward seal, said front roof support located a preselected distance from the bow assembly to define a predetermined top opening, a retractible, convertible soft top assembly secured to the rearwardly extending frame portion of the bow assembly with the convertible soft top adapted to fit into the rear opening and seal against the bow assembly rear seal, a removable hardtop roof removably locatable in the top opening, with the hardtop roof being sealed by the bow assembly front seal and the roof support forward seal, the hardtop roof being constructed of a molded reinforced plastic and providing upper seals for the side windows.

15. In a coupe type vehicle having a front and rear wheels and a generally notchback body structure with a hard roof supported by A, B and C pillars and having unframed side windows, fixed rear side glass and a rear window, and further having a transversely extending inner reinforcement header located beneath the front portion of the hard roof and extending between the A pillars, a converted vehicle converted to a combined hardtop-soft top vehicle comprising:

reinforcing means for reinforcing the underbody of the vehicle to compensate for loss of structural rigidity from subsequent removal of the hard roof, the hard roof removed by:
 (a) cutting the hard roof transversely between the A pillars and proximate to the inner reinforcement header leaving a relatively short roof portion extending generally coextensively with the reinforcement header,
 (b) cutting the hard roof from the B pillars at their upper ends, and
 (c) cutting the C pillars and hard roof from the vehicle body, a roll bar secured to the cut upper ends of the B pillars such that it extends transversely across the vehicle, providing a bow assembly of a molded reinforced plastic material to generally encase the roll bar, the bow assembly comprising an outer bow and frame member adapted to generally cover the outer surfaces of the roll bar and having a rearwardly extending frame portion defining a preselected rear opening, the bow assembly further comprising an inner bow member for generally covering the inner surfaces of the roll bar and adapted to be secured to the outer bow and frame member, a front roof support secured to the roof portion and reinforcement header, said front roof support including inner and outer header panels secured together at one end, the front roof support having the outer header panel located between the roof portion and reinforcement header and the inner header panel located beneath the reinforcement header, said front roof support a preselected distance from the bow assembly to define a predetermined top opening, a retractible, convertible soft top assembly secured to the rearwardly extending frame portion of the bow assembly with the convertible soft top adapted to fit into the rear opening, a removable hardtop roof removably locatable in the top opening.

16. The converted vehicle of claim 15 with said reinforcing means comprising longitudinally extending reinforcing sections including vehicle tie down means located between the front and rear wheels.

* * * * *

UNITED STATES PATENT AND TRADEMARK OFFICE
CERTIFICATE OF CORRECTION

PATENT NO. : 4,261,615

DATED : April 14, 1981

INVENTOR(S) : Dann T. Deaver

It is certified that error appears in the above—identified patent and that said Letters Patent is hereby corrected as shown below:

Abstract, line 4, "near" should be --rear--.

Column 6, line 2, "convertion" should be --conversion--.
Column 10, line 55, "said" should be --side--.
Column 17, line 26, "anc" should be --and--.

Signed and Sealed this

Tenth Day of November 1981

[SEAL]

Attest:

GERALD J. MOSSINGHOFF

Attesting Officer

Commissioner of Patents and Trademarks